US009659378B2

(12) United States Patent
Sasaki et al.

(10) Patent No.: US 9,659,378 B2
(45) Date of Patent: May 23, 2017

(54) POINT CLOUD POSITION DATA PROCESSING DEVICE, POINT CLOUD POSITION DATA PROCESSING SYSTEM, POINT CLOUD POSITION DATA PROCESSING METHOD, AND PROGRAM THEREFOR

(71) Applicant: KABUSHIKI KAISHA TOPCON, Itabashi-ku (JP)

(72) Inventors: You Sasaki, Itabashi-ku (JP); Tadayuki Ito, Itabashi-ku (JP); Kazuhiro Ogawa, Itabashi-ku (JP)

(73) Assignee: KABUSHIKI KAISHA TOPCON, Itabashi-ku (JP)

( * ) Notice: Subject to any disclaimer, the term of this patent is extended or adjusted under 35 U.S.C. 154(b) by 0 days.

(21) Appl. No.: 14/834,657

(22) Filed: Aug. 25, 2015

(65) Prior Publication Data
US 2016/0063717 A1 Mar. 3, 2016

(30) Foreign Application Priority Data

Aug. 26, 2014 (JP) .................................. 2014-171332

(51) Int. Cl.
*G06T 7/00* (2006.01)
*G01S 17/02* (2006.01)
*G01S 17/42* (2006.01)
*G01S 17/89* (2006.01)
*G01S 7/48* (2006.01)
*G01S 7/497* (2006.01)
(Continued)

(52) U.S. Cl.
CPC .............. *G06T 7/0057* (2013.01); *G01S 5/16* (2013.01); *G01S 7/4808* (2013.01); *G01S 7/497* (2013.01);
(Continued)

(58) Field of Classification Search
None
See application file for complete search history.

(56) References Cited

U.S. PATENT DOCUMENTS

2007/0103460 A1* 5/2007 Zhang .................. G06T 7/2033
345/419
2010/0002942 A1 1/2010 Watson
(Continued)

FOREIGN PATENT DOCUMENTS

| JP | 2013-40886 | 2/2013 |
|---|---|---|
| JP | 2013-186816 | 9/2013 |
| WO | WO 2008/023149 A1 | 2/2008 |

OTHER PUBLICATIONS

Extended European Search Report issued Jan. 21, 2016 in Patent Application No. 15181723.6.
(Continued)

*Primary Examiner* — Vu Nguyen
(74) *Attorney, Agent, or Firm* — Oblon, McClelland, Maier & Neustadt, L.L.P.

(57) ABSTRACT

A technique for performing calibration of a laser scanner efficiently is provided. Point cloud position data of a building 131 is obtained by a laser scanner 141 in which exterior orientation parameters are already known. On the other hand, the building 131 is scanned by a laser scanner 115 while a vehicle 100 travels, and point cloud position data of the building 131 measured by the laser scanner 115 is obtained based on a trajectory the vehicle 100 has traveled. Then, exterior orientation parameters of the laser scanner 115 are calculated based on a correspondence relationship between these two point cloud position data.

4 Claims, 4 Drawing Sheets

(51) Int. Cl.
G01S 17/58 (2006.01)
G06T 17/10 (2006.01)
G01S 5/16 (2006.01)
G06T 7/521 (2017.01)

(52) U.S. Cl.
CPC .......... *G01S 7/4972* (2013.01); *G01S 17/023* (2013.01); *G01S 17/42* (2013.01); *G01S 17/58* (2013.01); *G01S 17/89* (2013.01); *G06T 7/521* (2017.01); *G06T 17/10* (2013.01); *G06T 2207/10028* (2013.01); *G06T 2210/56* (2013.01); *G06T 2215/16* (2013.01)

(56) References Cited

U.S. PATENT DOCUMENTS

| | | |
|---|---|---|
| 2010/0176677 A1 | 7/2010 | Labbe et al. |
| 2013/0236107 A1 | 9/2013 | Fukaya et al. |
| 2014/0176677 A1 | 6/2014 | Valkenburg et al. |
| 2014/0210663 A1* | 7/2014 | Metzler .................. G01C 15/00 342/357.34 |
| 2014/0240690 A1* | 8/2014 | Newman ............... G01S 7/4808 356/4.01 |

OTHER PUBLICATIONS

U.S. Appl. No. 14/834,553, filed Aug. 25, 2015, Sasaki, et al.
U.S. Appl. No. 14/834,633, filed Aug. 25, 2015, Sasaki, et al.
U.S. Appl. No. 14/843,298, filed Sep. 2, 2015, Sasaki, et al.
Extended European Search Report issued Jun. 23, 2016 in Patent Application No. 15181723.6.
Cancellation of European Patent Bulletin of the European Search Report issued Jun. 24, 2016 in Patent Application No. 15181723.6.

* cited by examiner

POINT CLOUD POSITION DATA PROCESSING DEVICE, POINT CLOUD POSITION DATA PROCESSING SYSTEM, POINT CLOUD POSITION DATA PROCESSING METHOD, AND PROGRAM THEREFOR

BACKGROUND OF THE INVENTION

Technical Field

The present invention relates to a technique for calibrating a laser scanner.

Background Art

Laser scanners emit laser light on objects to be measured and obtain point cloud position data based on light reflected by the objects. The point cloud position data contains data of three-dimensional coordinates of measured points obtained in dot-like shapes, and a three-dimensional model (for example, a three-dimensional CAD data) of the object can be obtained based on the point cloud position data. For example, when a vehicle, which is equipped with an IMU (Inertial Measurement Unit) and a laser scanner, travels, point cloud position data of the surrounding is obtained by the laser scanner while the location and the attitude of the vehicle are measured by the IMU, whereby a three-dimensional model of the surrounding conditions of the traveled route can be obtained (for example, refer to Japanese Unexamined Patent Application Laid-Open No. 2013-40886).

In the above technique, information (exterior orientation parameters) relating to the position and the attitude of the laser scanner with respect to the IMU must be known in advance. In general, a measuring system is produced by assembling an IMU with a laser scanner therein, in an integrated form, and calibration for determining the exterior orientation parameters of the laser scanner is performed when the measuring system is shipped as a product. Thereafter, the measuring system having the laser scanner that is calibrated is installed in a vehicle.

However, there may be cases in which a user desires to set the laser scanner at a freely selected position in a freely selected attitude when the measuring system is mounted on a vehicle. Moreover, in cases in which the user's vehicle is of a vehicle type or is a vehicle with a structure that is unexpected by the manufacturer of the measuring system, it would be necessary to change the position and the attitude of the laser scanner in accordance with the vehicle.

SUMMARY OF THE INVENTION

In such cases, the laser scanner must be calibrated in a condition in which the laser scanner is mounted on the vehicle. However, complicated procedures are required for the calibration, and therefore, a technique for calibrating in a simpler manner is desired. In view of these circumstances, an object of the present invention is to provide a technique for performing calibration of a laser scanner efficiently.

A first aspect of the present invention provides a point cloud position data processing device including a data receiving circuit, a comparative point cloud position data calculating circuit, and an exterior orientation parameter calculating circuit. The data receiving circuit receives reference point cloud position data, which is point cloud position data of an object to be measured, and receives comparative laser scan data, which is obtained by scanning the object with laser light while a vehicle travels. The laser light is emitted from a laser scanner that is fixed on the vehicle and that is to be calibrated. The comparative point cloud position data calculating circuit calculates comparative point cloud position data in a coordinate system of the reference point cloud position data from the comparative laser scan data based on a trajectory the laser scanner has traveled. The exterior orientation parameter calculating circuit calculates exterior orientation parameters of the laser scanner based on a correspondence relationship between the reference point cloud position data and the comparative point cloud position data.

A second aspect of the present invention provides a point cloud position data processing system including a means for obtaining reference point cloud position data, which is point cloud position data of an object to be measured, and a means for obtaining comparative laser scan data by scanning the object with laser light while a vehicle travels. The laser light is emitted from a laser scanner that is fixed on the vehicle and that is to be calibrated. The system further includes a means for calculating comparative point cloud position data in a coordinate system of the reference point cloud position data from the comparative laser scan data based on a trajectory the laser scanner has traveled and a means for calculating exterior orientation parameters of the laser scanner based on correspondence relationship between the reference point cloud position data and the comparative point cloud position data.

A third aspect of the present invention provides a point cloud position data processing method including obtaining reference point cloud position data, which is point cloud position data of an object to be measured, and obtaining comparative laser scan data by scanning the object with laser light while a vehicle travels. The laser light is emitted from a laser scanner that is fixed on the vehicle and that is to be calibrated. The method further includes calculating comparative point cloud position data in a coordinate system of the reference point cloud position data from the comparative laser scan data based on a trajectory the laser scanner has traveled and calculating exterior orientation parameters of the laser scanner based on a correspondence relationship between the reference point cloud position data and the comparative point cloud position data.

A fourth aspect of the present invention provides a storage medium storing a program to be read and executed by a computer, the program allowing the computer to receive reference point cloud position data, which is point cloud position data of an object to be measured, and to receive comparative laser scan data, which is obtained by scanning the object with laser light while a vehicle travels. The laser light is emitted from a laser scanner that is fixed on the vehicle and that is to be calibrated. The program also allows the computer to calculate comparative point cloud position data in a coordinate system of the reference point cloud position data from the comparative laser scan data based on a trajectory the laser scanner has traveled and to calculate exterior orientation parameters of the laser scanner based on a correspondence relationship between the reference point cloud position data and the comparative point cloud position data.

According to the present invention, the calibration of a laser scanner can be performed efficiently.

PREFERRED EMBODIMENTS OF THE INVENTION

Structure

Figure 1:
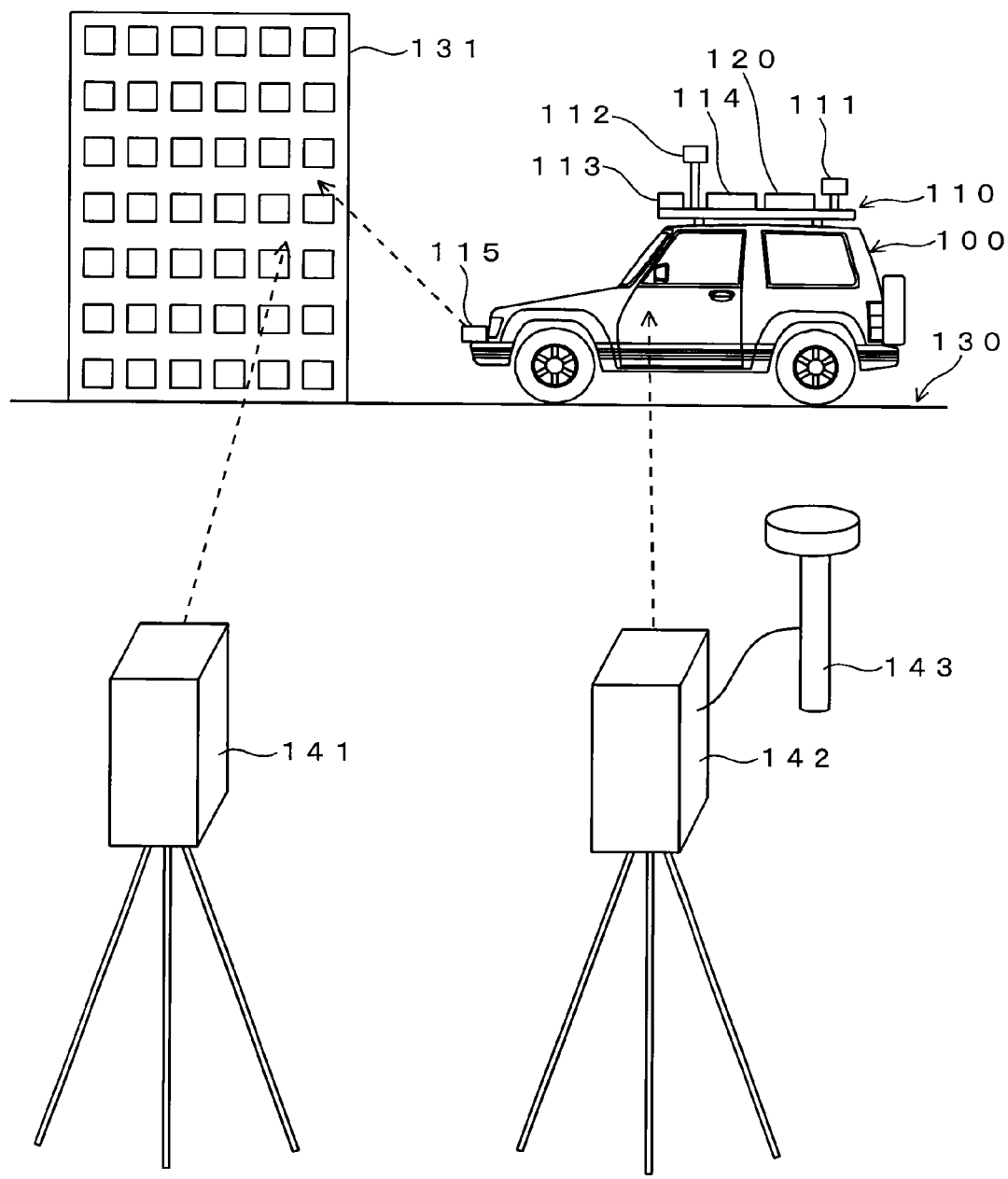
FIG. 1 is a conceptual diagram of an embodiment.

FIG. 1 conceptually shows a condition of a site in which calibration is performed. In this embodiment, exterior orientation parameters of a laser scanner 115 mounted on a vehicle 100 are determined. Here, the position and the attitude with respect to an IMU 114 are used as the exterior orientation parameters of the laser scanner 115. It should be noted that the position and the attitude with respect to a measuring system 110, or the position and the attitude with respect to the vehicle 100, may also be used as the exterior orientation parameters of the laser scanner 115.

The vehicle 100 is mounted with the measuring system 110. The measuring system 110 includes a GNSS unit 111, a panoramic camera 112, a fixed direction camera 113, the IMU 114, and a processor 120, which are arranged on a base.

The GNSS unit 111 receives navigation signals from a navigation satellite, such as a GPS satellite or the like, and outputs its location information and time information, which is calibrated and has high precision (time information provided from the navigation satellite which is to be used as a reference in measurements). The panoramic camera 112 photographs moving images of circumstances in 360 degrees. The fixed direction camera 113 is directed to a particular direction and photographs moving images in this direction. The IMU 114 is an inertial measurement unit, and it detects acceleration and measures changes of its location and its attitude.

The panoramic camera 112, the fixed direction camera 113, the IMU 114, and the processor 120 are provided with a synchronizing signal from the GNSS unit 111, and they can operate synchronously. It should be noted that an oscillator for generating a synchronizing signal may be prepared, and a signal output from the oscillator may be used as a reference synchronizing signal. The IMU 114 is preliminarily calibrated based on a ground coordinate system. The ground coordinate system is an absolute coordinate system fixed relative to the ground and is a three-dimensional orthogonal coordinate system that describes geographical locations measured by the GNSS unit 111. Moreover, the IMU 114 is calibrated at predetermined timings based on the location information and the time information, which are obtained from the GNSS unit 111.

The following information is measured in advance and is stored in a memory of the processor 120. The information includes the position and the attitude of the measuring system 110 with respect to the vehicle 100, the position and the attitude of the IMU 114 with respect to the measuring system 110, the position (position of an antenna part) of the GNSS unit 111 with respect to the IMU 114, and the positions and the attitudes of the panoramic camera 112 and the fixed direction camera 113 with respect to the IMU 114.

The laser scanner 115, which is a laser scanner to be calibrated, is fixed at a front part of the vehicle 100. The laser scanner 115 emits laser light on an object to be measured by scanning linearly and obtains point cloud position data of the object by detecting light reflected by the object. The laser scanning is performed by the laser scanner 115 while the vehicle 100 travels, whereby point cloud position data in a direction in which the laser scanner 115 is directed is obtained. The point cloud position data is formed of three-dimensional coordinate data of numerous points. According to the point cloud position data, an outer shape of the object is converted into data by a set of points in which three-dimensional coordinates are determined.

The laser scanner 115 is mounted on the vehicle 100 at a freely selected position in a freely selected direction by a user. Therefore, exterior orientation parameters of the laser scanner 115 are not clear immediately after it is mounted on the vehicle 100.

The processor 120 is hardware that functions as a computer and includes a CPU, a memory, a variety of interfaces, and other necessary electronic circuits. The processor 120 can be understood to be hardware including each functioning unit shown in FIG. 2. Each of the functioning units shown in FIG. 2 may be constructed of software, or one or a plurality of the functioning units may be constructed of dedicated hardware. Programs for executing the function of the processor 120 and programs for executing the function of each of the functioning units are stored in the memory of the processor 120. It should be noted that these programs may be stored in external storage media and be provided therefrom. Moreover, each of the functioning units shown in FIG. 2 may be constructed of a dedicated operational circuit. The functioning unit constructed of software and the functioning unit constructed of a dedicated operational circuit may be used together. For example, each of the functioning units shown in FIG. 2 can be formed of an electronic circuit such as a CPU (Central Processing Unit), an ASIC (Application Specific Integrated Circuit), a PLD (Programmable Logic Device) such as a FPGA (Field Programmable Gate Array), or the like.

Whether each of the functioning units is constructed of a dedicated hardware or is constructed of software that is executed by a program in a CPU is selected in consideration of a required processing speed, the production cost, consumption amount of electric power, etc. For example, when a particular functioning unit is constructed of a FPGA, the processing speed is superior, but the production cost is high. On the other hand, when a particular functioning unit is constructed of software executed by a program in a CPU, materials for hardware are conserved, whereby the production cost is improved. However, in such cases of executing the function of the functioning unit by the CPU, the processing speed is inferior when compared with that in cases of using dedicated hardware. In addition, when the function of the functioning unit is executed by the CPU, there may be cases in which complicated calculations cannot be performed. The type of the functioning unit constructed of dedicated hardware and the type of the functioning unit constructed of software have the above differences, but these are equivalent in capability of performing a specific function.

The processor 120 includes a data receiving part 121, a trajectory calculator 122, a comparative point cloud position data calculator 123, and an exterior orientation parameter calculator 124. The data receiving part 121 receives laser scan data measured by the laser scanner 115 shown in FIG. 1, reference point cloud position data measured by a reference laser scanner 141, data relating to a trajectory (traveled route) of the vehicle 100 measured by a total station 142, and other data used in the processor 120, from the outside. The data receiving part 121 receives data through wireless communication or wired communication.

The reference laser scanner 141 obtains point cloud position data of an object to be measured (for example, a building 131) around a calibration course 130, as reference point cloud position data, in a condition in which the exterior orientation parameters thereof are obtained. Here, the scanning area within which reference point cloud position data is obtained is set so as to overlap the scanning area of the laser scanner 115 to be calibrated. For example, point cloud position data of the building 131 standing beside the calibration course 130 is obtained as reference point cloud position data. The reference point cloud position data is described based on a three-dimensional orthogonal coordinate system having an origin at an appropriate location. Here, the ground coordinate system is used as the coordinate system of the reference point cloud position data.

The total station 142 measures a trajectory of the vehicle 100 traveling on the calibration course 130 in a condition in which exterior orientation parameters thereof in the ground coordinate system are obtained. The total station 142 emits laser light on an object to be measured and detects light reflected by the object, and it thereby measures a distance and a direction to the object therefrom. By performing this measurement in a condition in which the exterior orientation parameters of the total station 142 are obtained in advance, the position of the object can be measured. In addition, by measuring the position constantly, a trajectory of the moving object in the ground coordinate system can be measured. A synchronizing signal obtained by the navigation satellite is input from a GNSS unit 143 to the total station 142, whereby the total station 142 operates synchronously with the time used in the vehicle 100. The position of the IMU 114 is used as the position of the vehicle 100.

The trajectory calculator 122 calculates a trajectory the vehicle 100 has traveled in the ground coordinate system. The trajectory of the vehicle 100 is calculated based on location information of the vehicle 100 obtained from the total station 142 that operates synchronously with the devices on the vehicle 100. That is, position data of the vehicle 100 at each time is obtained from the total station 142, and trajectory data of the vehicle 100 can be obtained by tracking this position data. This processing is performed by the trajectory calculator 122.

A processing of calculating a trajectory of the vehicle 100 based on the output of the IMU 114 and the GNSS unit 111 and output from an external device may also be performed by the trajectory calculator 122. In this case, the output from the external device is taken in the trajectory calculator 122 and is integrally processed in conjunction with the IMU information and the GNSS information, whereby the trajectory of the vehicle 100 are calculated.

A processing of calculating the traveled route (trajectory) of the vehicle 100 from moving images photographed from the moving vehicle 100 may also be performed by the trajectory calculator 122. Such technique is disclosed in, for example, Japanese Unexamined Patent Application Laid-Open No. 2013-186816. In this case, a processing of calculating positions that constantly changed of the vehicle 100 (that is, a trajectory of the vehicle 100) is performed by the trajectory calculator 122 by using images photographed by the panoramic camera 112 or the fixed direction camera 113.

Trajectories of the vehicle are described in the ground coordinate system that is used to describe the reference point cloud position data. For example, when a trajectory of the vehicle 100 is measured by using the total station 142, since the exterior orientation parameters of the total station 142 are preliminarily obtained, the trajectory of the vehicle 100 can be described in the same ground coordinate system as for the reference point cloud position data.

Similarly, in a case of determining a trajectory of the vehicle 100 by using the IMU 114, since the IMU 114 is preliminarily calibrated based on the ground coordinate system, the trajectory of the vehicle 100 can be described in the same ground coordinate system as for the reference point cloud position data.

In addition, in a case of calculating a trajectory of the vehicle 100 by using images photographed by the panoramic camera 112 or the fixed direction camera 113, the trajectory of the vehicle 100 can be described in the same ground coordinate system as for the reference point cloud position data provided that initial values of the panoramic camera 112 or the fixed direction camera 113 are preliminarily calibrated based on the ground coordinate system.

The comparative point cloud position data calculator 123 calculates comparative point cloud position data based on comparative laser scan data obtained by the laser scanner 115. The comparative laser scan data is data of laser scanning performed for calibrating (processing for determining the exterior orientation parameters) the laser scanner 115. The comparative laser scan data is obtained while the vehicle 100 travels on the calibration course 130. Therefore, each of the scan data obtained by the laser scanner 115 has a different origin point (view point) and is thereby not described in the same coordinate system.

Since a trajectory of the vehicle 100 on the calibration course 130 is calculated by the trajectory calculator 122, the correspondence relationship between the position and the attitude of the origin point (view point) of each of the scan data of the laser scanner 115 can be calculated. Therefore, by converting the coordinate system of each of the comparative laser scan data into a particular coordinate system based on the trajectory data of the vehicle 100, comparative point cloud position data can be obtained. This processing is performed by the comparative point cloud position data calculator 123.

For example, while the vehicle 100 travels on the calibration course 130, the building 131 is scanned with laser light by the laser scanner 115, and scan data relating to the building 131 is obtained. This scan data is used as the comparative laser scan data. Then, point cloud position data of the building 131, which is described in the same coordinate system (ground coordinate system) as for the reference point cloud position data, is obtained as the comparative point cloud position data based on the comparative laser scan data relating to the building 131.

Figure 3:
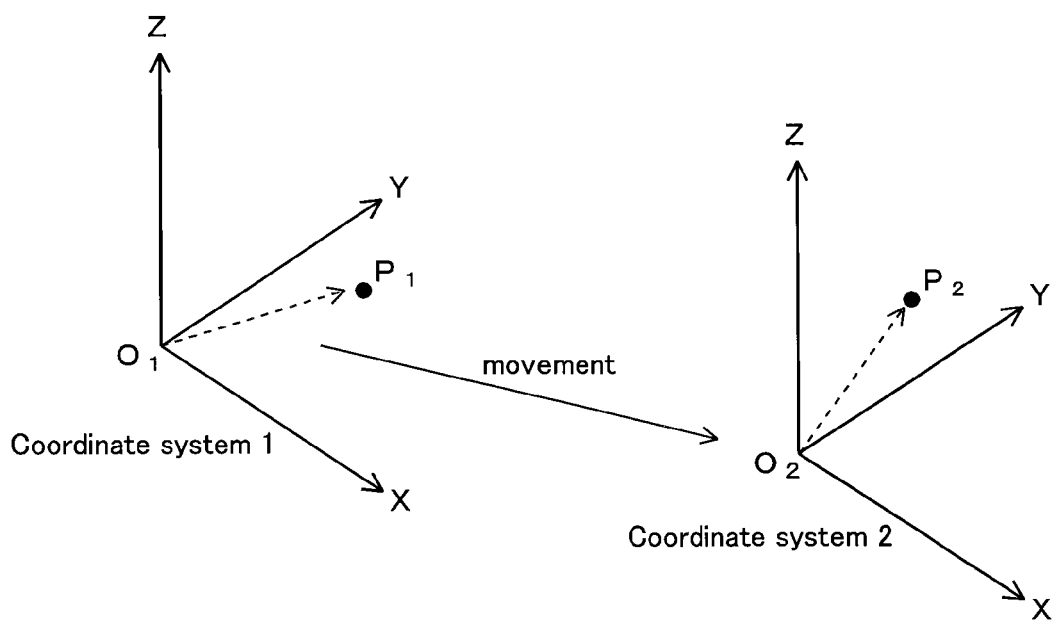
FIG. 3 is a relationship figure showing a relationship of a coordinate system between scan data obtained while moving.

The processing performed by the comparative point cloud position data calculator 123 will be described hereinafter. The comparative laser scan data is obtained by laser scanning while traveling. Therefore, the origin point (view point) of the comparative laser scan data obtained by the laser scanner 115 is constantly changing. FIG. 3 shows an exaggerated positional relationship between scan points $P_1$ and $P_2$ of the comparative laser scan data. FIG. 3 shows a case in which the scan point $P_1$ is obtained prior to obtaining the scan point $P_2$ while the laser scanner 115 moves from a position $O_1$ to a position $O_2$.

As shown in FIG. 3, in the comparative laser scan data, there is a positional relationship between the scan point $P_1$ obtained at the position $O_1$ and the scan point $P_2$ obtained at the position $O_2$. Here, since the positions $O_1$ and $O_2$ differ from each other, a coordinate system 1 and a coordinate system 2 for describing the two scan points are not the same.

Accordingly, the coordinate system of the scan points $P_1$ and $P_2$ are integrated according to the following principle. First, trajectory data of the vehicle 100 in the ground coordinate system is obtained while the comparative laser scan data is obtained. The trajectory data of the vehicle 100 in the ground coordinate system is obtained by, for example, automatically tracking the vehicle 100 by the total station 142 in which the exterior orientation parameters are already known. According to the trajectory of the vehicle 100, the position and the attitude of the vehicle 100 at each time are determined.

On the other hand, since the laser scanner 115 is provided with the reference time from the GNSS unit 111, each scan point of the comparative laser scan data is linked with the time when it is obtained. For example, in the case shown in FIG. 3, the coordinate data of the point $P_1$ linked with the time when the point $P_1$ is obtained is included in the comparative laser scan data.

Since the vehicle 100 passed the positions $O_1$ and $O_2$, and the total station 142 is provided with the reference time from the GNSS unit 143, the relative relationships of position and attitude between the coordinate systems 1 and 2 in FIG. 3 are determined from the trajectory data of the vehicle 100 based on the time. That is, the relationships between the position $O_1$ and the attitude of the coordinate system 1 at a time $t_1$ and the position $O_2$ and the attitude of the coordinate system 2 at a time $t_2$ are determined by the trajectory of the vehicle 100.

The position and the attitude of the vehicle 100 at each time are known from the trajectory of the vehicle 100. Therefore, by setting a correction amount (estimated margin of error) of the exterior orientation parameters of the laser scanner 115, the coordinate systems 1 and 2 can be converted into the ground coordinate system, and the points $P_1$ and $P_2$ can be described based on the ground coordinate system, even though some margin of error (calibration error) is contained. Thus, the coordinate systems of the points $P_1$ and $P_2$ are integrated, and the coordinates of the points $P_1$ and $P_2$ can be described in the ground coordinate system.

In the above case, the two points $P_1$ and $P_2$ are used as the comparative laser scan data. Similarly, when the points of the comparative laser scan data are further increased such that the points are $P_3$, $P_4$, $P_5$, ..., each of the scan data can be described based on the ground coordinate system because the position and the attitude of the vehicle 100 at the time when each of the scan data is obtained are known from the trajectory of the vehicle 100. Thus, comparative point cloud position data, in which the comparative laser scan data is described based on the ground coordinate system, is obtained. It should be noted that because the exterior orientation parameters (position and attitude with respect to the IMU 114) of the laser scanner 115 are unknown, the comparative point cloud position data contains corresponding margin of error, as described above.

A specific example of the comparative point cloud position data will be described as follows. The First Formula represents the i-th comparative point cloud position data $P_{mms}(i)$ which is described based on the ground coordinate system. In this case, the calculation of the following First Formula is performed by the comparative point cloud position data calculator 123.

$$P_{mms}(i)=\text{Pos}_{vehicle}(T_i)+\text{Att}_{vehicle}(T_i)\cdot(\text{Pos}_{scanner}+(\text{Att}_{scanner}\cdot\text{Scan}(i)))$$

First Formula $T_i$: Time when i-th measurement is performed by the laser scanner 115.

$\text{Pos}_{vehicle}(T_i)$: Position of the vehicle 100 in the ground coordinate system at a time Ti (Position of the IMU 114).

$\text{Att}_{vehicle}(T_i)$: Attitude of the vehicle 100 in the ground coordinate system at a time Ti (Attitude of the IMU 114).

$\text{Pos}_{scanner}$: Position of the laser scanner 115 in the IMU coordinate system (coordinate system used in the IMU 114).

The value of $\text{Pos}_{scanner}$ contains a margin of error.

$\text{Att}_{scanner}$: Attitude of the laser scanner 115 in the IMU coordinate system.

The value of $\text{Att}_{scanner}$ contains a margin of error.

Scan(i): Coordinate values of i-th scan point in the coordinate system of the laser scanner 115.

As an example of the coordinate system of the laser scanner 115, the coordinate system 1 or the coordinate system 2 in FIG. 3 is described.

The exterior orientation parameter calculator 124 examines the correspondence relationship between the reference point cloud position data and the comparative point cloud position data and calculates the exterior orientation parameters (position and attitude with respect to the IMU 114) of the laser scanner 115 based on a condition in which the correspondence relationship satisfies a particular condition.

The processing performed by the exterior orientation parameter calculator 124 will be described hereinafter. In this example, scanning is performed so that the scanning area of the reference point cloud position data overlaps the scanning area of the comparative point cloud position data. For example, scanning is performed so that the building 131 is contained in both the scanning area of the reference point cloud position data and the scanning area of the comparative point cloud position data.

In this step, unknown parameters are the exterior orientation parameters of the laser scanner 115, that is, the position and the attitude of the laser scanner 115 with respect to the IMU 114. However, as shown in the First Formula, exterior orientation parameters containing a margin of error can be temporarily set.

If the margin of error of the temporarily set value from a true value is large, a margin of error in matching the reference point cloud position data and the comparative point cloud position data is large. On the other hand, if the temporarily set value is nearer the true value, the margin of error in matching the reference point cloud position data and the comparative point cloud position data is smaller. Conversely, when the margin of error in matching the reference point cloud position data and the comparative point cloud position data is smaller, the temporarily set value of the exterior orientation parameters of the laser scanner 115 is nearer the true value.

Here, the exterior orientation parameters of the laser scanner 115 are used as unknown parameters, and a convergence condition is searched by adjusting the unknown parameters. As the convergence condition, a condition in which the unknown parameters converge, a condition in which the margin of a matching error is minimum, a condition in which the margin of the matching error is not more than a threshold value, or a combination of a plurality of these conditions may be described.

For example, if the margin of error in matching the reference point cloud position data and the comparative point cloud position data is large, the temporarily set values of the exterior orientation parameters of the laser scanner 115, which are unknown parameters, are difficult to converge. On the other hand, in a condition in which the unknown parameters converge and are stable at specific values, the margin of error in matching the reference point cloud position data and the comparative point cloud position data is small, and the unknown parameters are near the true values. By using this function, converged exterior orientation parameters can be used as true values.

Figure 4:
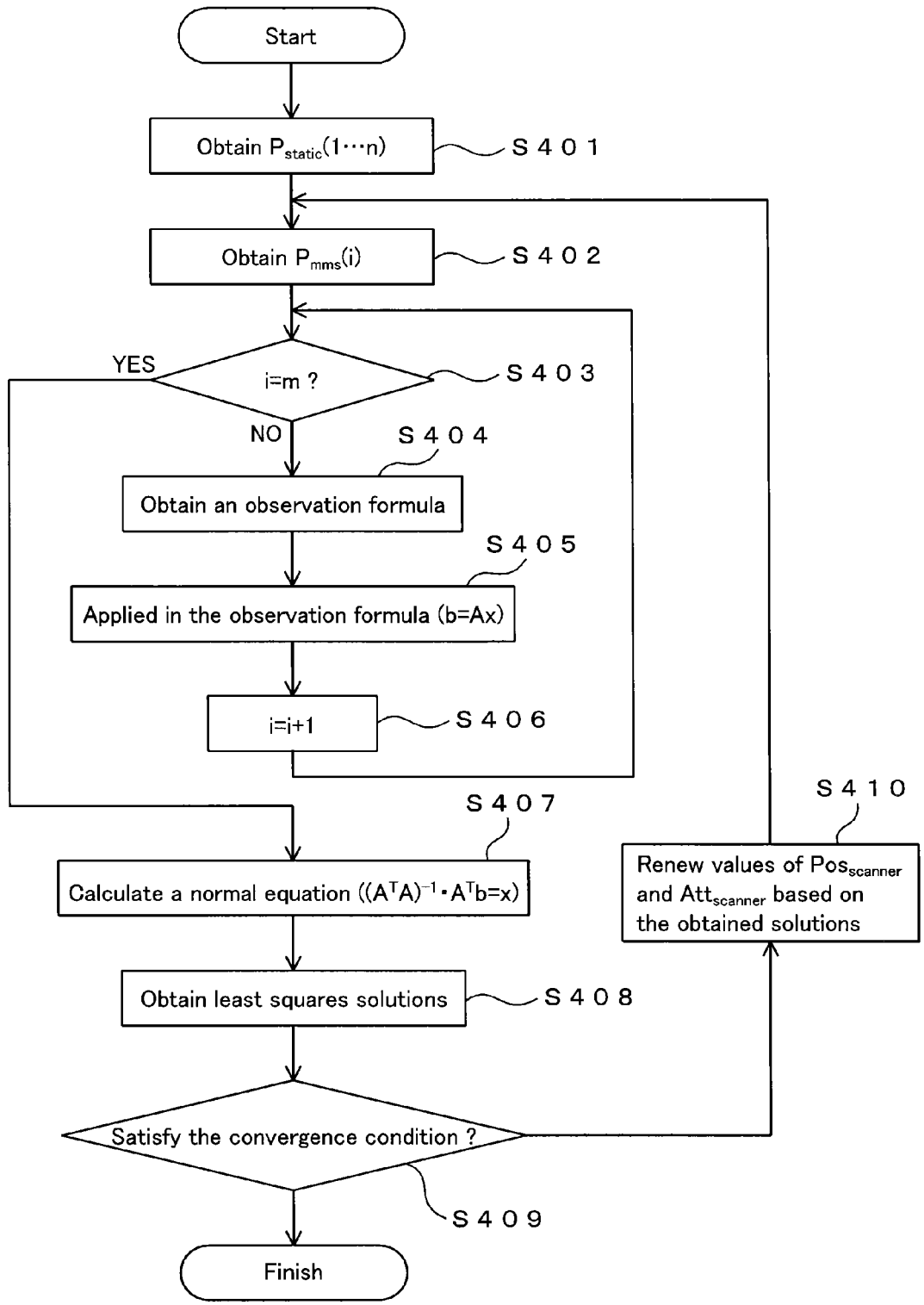
FIG. 4 is a flow chart showing an example of a processing for calculating exterior orientation parameters.

A specific example will be described as follows. FIG. 4 shows an example of a processing performed by the exterior orientation parameter calculator 124. When the processing is started, reference point cloud position data of n points, $P_{static}(1 \ldots n)$, measured by the reference laser scanner 141, is obtained (step S401).

Then, comparative point cloud position data of m points, $P_{mms}(i)$, in which the comparative laser scan data obtained by the laser scanner 115 is described in the ground coordinate system by the First Formula, is obtained (step S402).

Next, whether measured values of each point are settled in an observation formula is examined (step S403). The observation formula will be described later. If the measured values of each point are settled in the observation formula, the processing goes to step S407, otherwise the processing goes to step S404.

In the step S404, the observation formula for evaluating the margin of error in matching the reference point cloud position data and the comparative point cloud position data is obtained. The detail of the observation formula will be described hereinafter.

First, assuming that a point of the comparative point cloud position data nearest to a point ($P_{static}(j)$) of the reference point cloud position data is represented as $P_{mms}(i)$ (calculated by the First Formula), a matching error $\Delta P$ is represented by the following Second Formula.

$$\Delta P = P_{mms}(i) - P_{static}(j) \qquad \text{Second Formula}$$

The value of $\Delta P$ is calculated as a difference between a point and a point or a difference between a point and a plane along a normal vector of $P_{static}(j)$.

In this step, unknown parameters are the exterior orientation parameters (position and attitude with respect to the IMU 114) of the laser scanner 115. Therefore, assuming that correction amounts for $Pos_{scanner}$ and $Att_{scanner}$ from initial values thereof are represented by $\delta Pos_{scanner}$ and $\delta Att_{scanner}$, respectively, as the unknown parameters, the following Third Formula is established. In the Third Formula, the symbol "$[\ ]^T$" represents transposition, and the symbol "J" represents a Jacobian matrix.

$$\Delta P = J[\delta Pos_{scanner}, \delta Att_{scanner}]^T \qquad \text{Third Formula}$$

The initial values of $Pos_{scanner}$ and $Att_{scanner}$ are set based on an approximate position and an approximate attitude of the laser scanner 115 mounted on the vehicle 100. As the method for setting the initial values, a method of inputting them by a user, a method of selecting one set from plural sets of approximate values, which are prepared in advance, by a user, or a method of photographing the laser scanner 115 by another camera, etc. and estimating approximate values by image analysis, may be described. The initial values can be approximate values because they can contain margins of error.

Here, assuming that $b = \Delta P$, $A = J$, $x = [\delta Pos_{scanner}, \delta Att_{scanner}]^T$, the following Fourth Formula is obtained.

$$b = Ax \qquad \text{Fourth Formula}$$

The Fourth Formula is used as the observation formula for evaluating the margin of error in matching the reference point cloud position data and the comparative point cloud position data (step S404).

After the observation formula of the Fourth Formula is prepared, the measured values are applied in the observation formula (step S405, step S406).

After the measured values of each point are applied in the observation formula of the Fourth Formula, the processing goes from the step S403 to the step S407. In the step S407, a normal equation (Sixth Formula, described later) is obtained by the following steps. First, the Fourth Formula is multiplied by a transposed matrix $A^T$ of the matrix A from the left side, whereby the Fifth Formula is obtained.

$$A^T b = A^T A x \qquad \text{Fifth Formula}$$

The Fifth Formula is multiplied by an inverse matrix $(A^T A)^{-1}$ of the matrix $A^T A$ from the left side, whereby the Sixth Formula (normal equation) is obtained.

$$(A^T A)^{-1} \cdot A^T b = x \qquad \text{Sixth Formula}$$

Least squares solutions of the correction amounts $\delta Pos_{scanner}$ and $\delta Att_{scanner}$ from the initial values are obtained from the Sixth Formula (step S408).

Then, if the convergence condition is satisfied, the processing is finished; otherwise the processing goes to step S410. As the convergence condition, a condition in which the value of the matching error $\Delta P$ comes to be not more than a predetermined threshold value or a condition in which the value of the matching error $\Delta P$ cannot be made smaller (the value of $\Delta P$ is minimum) may be described. In addition, a condition, in which the correction amounts converge to particular values, can also be used as the convergence condition.

In the step S410, the values of $\delta Pos_{scanner}$ and $\delta Att_{scanner}$ obtained in the step S408 are included in the initial values of $Pos_{scanner}$ and $Att_{scanner}$ as new correction amounts, and comparative point cloud position data $P_{mms}(1 \ldots m)$ is generated by using the modified initial values again (step S402). Then, the step S403 and the subsequent steps are performed again.

That is, in the processing from the step S410 to the step S402 and the subsequent steps, the comparative point cloud position data $P_{mms}(1 \ldots m)$ is corrected by correcting the values of $\delta Pos_{scanner}$ and $\delta Att_{scanner}$, and the processing for matching the comparative point cloud position data $P_{mms}(1 \ldots m)$ and the reference point cloud position data $P_{static}(1 \ldots n)$ is performed again. The processing is repeated until the convergence condition is satisfied, whereby correction amounts $\delta Pos_{scanner}$ and $\delta Att_{scanner}$ nearer to the true values are obtained.

By calculating the correction amounts $\delta Pos_{scanner}$ and $\delta Att_{scanner}$ from the initial values of $Pos_{scanner}$ and $Att_{scanner}$, the exterior orientation parameters of the laser scanner 115, that is, the position and the attitude of the laser scanner 115 with respect to the IMU 114 are calculated. Thus, the unknown exterior orientation parameters of the laser scanner 115 on the vehicle 100 are determined.

It should be noted that the unknown parameters are not limited to the above examples. The unknown parameters may include the values of $Pos_{scanner}$ and $Att_{scanner}$, or unknown parameters including margins of errors in the calibration (tilt of an axis, a margin of error in distance measuring, etc.), which are specific to the scanner, can also be solved.

Although not shown in the figures, the processor 120 has a function of integrally processing information obtained by the GNSS unit 111, the panoramic camera 112, the fixed direction camera 113, the IMU 114, and the laser scanner 115, and obtaining three-dimensional data of conditions surrounding the vehicle 100 traveled. By using the three-dimensional data, a three-dimensional model of the circumstance, in which the vehicle 100 traveled, can be generated.

Example of Processing

Figure 5:
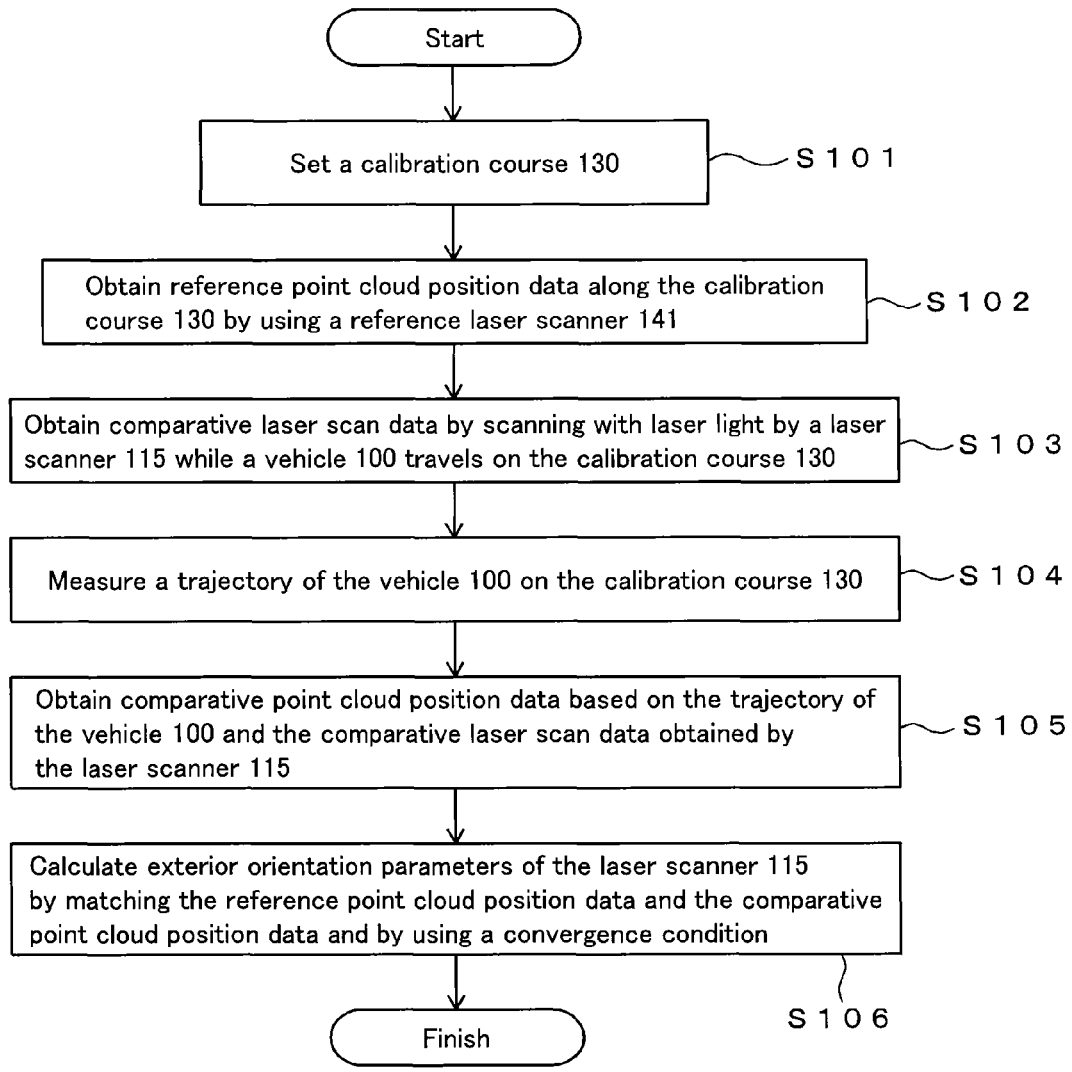
FIG. 5 is a flow chart showing an example of a processing of an embodiment.

An example of the processing for calculating the exterior orientation parameters of the laser scanner 115 will be described hereinafter. FIG. 5 is a flow chart showing an outline of the processing. First, the vehicle 100 equipped with the measuring system 110 and the laser scanner 115 is prepared. In this stage, the position of the GNSS unit 111 on the measuring system 110, the exterior orientation parameters of the panoramic camera 112 and the fixed direction camera 113, and the position and the attitude of the IMU 114 are measured and are already known. In addition, the laser scanner 115 is mounted on the vehicle 100 at a position freely selected by a user, and the approximate position and the approximate attitude thereof are already known, but accurate exterior orientation parameters (position and attitude with respect to the IMU 114) are not determined.

After the vehicle 100 is prepared, a calibration course 130 is set (step S101). As the calibration course 130, a linear course at a location having a structural object, which is easy to be an object for point cloud position data, such as the building 131 nearby thereto, is selected.

After the calibration course 130 is set, a fixed type reference laser scanner 141 is located near the calibration course 130, and exterior orientation parameters thereof are obtained. Then, point cloud position data of the surrounding of the calibration course 130 is obtained as reference point cloud position data by using the reference laser scanner 141 (step S102). In this example, the reference laser scanner 141 scans the building 131 with laser light and obtains point cloud position data of the building 131 as the reference point cloud position data.

Next, the vehicle 100 is started to travel on the calibration course 130. At this time, laser scanning is performed by the mounted laser scanner 115, and comparative laser scan data is obtained (step S103). This laser scanning is performed so as to overlap the scan area of the reference point cloud position data. In this example, while the vehicle 100 travels, the building 131 is scanned with laser light by the laser scanner 115, and comparative laser scan data, in which the building 131 is the measured object, is obtained.

In addition, a trajectory of the vehicle 100 traveling on the calibration course 130 in the step S103 is measured by the total station 142 (step S104). The trajectory of the vehicle 100 may be obtained by another method such as a method using the IMU 114 or the like.

Next, comparative point cloud position data is calculated based on the trajectory of the vehicle 100 on the calibration course 130 obtained in the step S104 and based on the comparative laser scan data obtained by the laser scanner 115 while the vehicle 100 travels on the calibration course 130 (step S105). This processing is performed by the comparative point cloud position data calculator 123. In this processing, calculation for describing the comparative laser scan data, which is obtained during moving, based on the ground coordinate system (coordinate system of the reference point cloud position data), as represented by the First Formula described above, is performed.

Then, the reference point cloud position data obtained by the reference laser scanner 141 is matched with the comparative point cloud position data, which is based on the comparative laser scan data obtained by the laser scanner 115, and the exterior orientation parameters of the laser scanner 115 are calculated by using the convergence condition (step S106). By this step, the position and the attitude of the laser scanner 115 with respect to the IMU 114 are calculated. This step is performed by the exterior orientation parameter calculator 124 according to the procedure shown in FIG. 4.

According to this embodiment, even when the mounted position and the attitude of the laser scanner 115 are unknown, by performing laser scanning by the laser scanner 115 while the vehicle 100 travels on the calibration course 130, the exterior orientation parameters of the laser scanner 115 are calculated. For example, even in a case in which the laser scanner 115 is mounted by a user, or even in a case in which the position and the attitude of the laser scanner 115 are changed, the exterior orientation parameters of the laser scanner 115 can be calculated in a simple manner.

Other Matters

Figure 2:
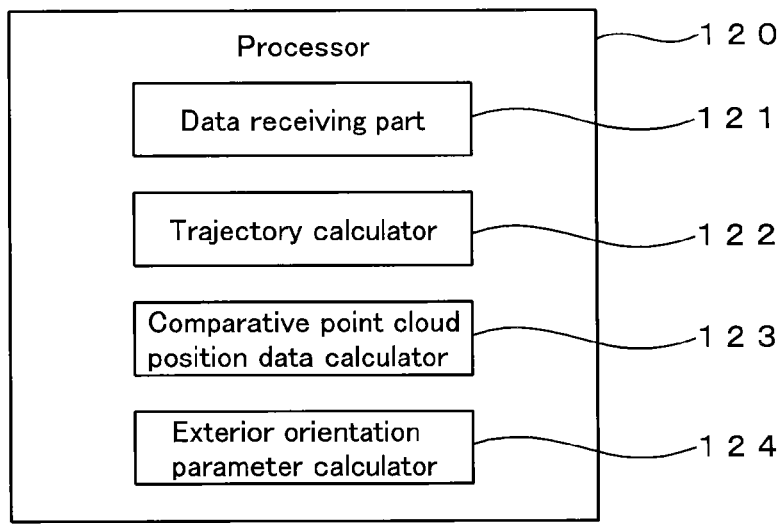
FIG. 2 is a block diagram of a processor.

One or more of the functioning units of the processor 120 shown in FIG. 2 may be constructed of separate hardware and then be connected by an appropriate communication means so as to be operated as a system. For example, an exterior device (personal computer or dedicated computer) for executing a part of the functions of the processor 120 may be connected with the processor 120, whereby a structure, in which a part of the functions of the processor 120 is performed by the exterior device, can be formed.

FIG. 1 shows an example of using the reference laser scanner 141 as a device for obtaining the reference point cloud position data. Alternatively, the reference point cloud position data may be obtained by extracting characteristic points from stereoscopically photographed images. In this case, stereo image data is obtained by photographing circumstances along the calibration course by a stereoscopic camera, and characteristic points are extracted from the images by analyzing the stereo image data. Then, three-dimensional coordinates of the extracted characteristic points are calculated according to the principle of the stereoscopic image measurement, whereby reference point cloud position data is obtained.

The calibration course 130 can be fixed by using rails or the like. Thus, the trajectory of the vehicle 100 on the calibration course 130 can be obtained with greater precision.

In recent years, technology for performing automatic driving or assisted driving of a vehicle by obtaining surrounding three-dimensional information from the vehicle has been publicly known. The present invention can also be utilized in cases in which a laser scanner is used for this technology.

The present invention can be utilized for techniques of determining exterior orientation parameters of laser scanners.

What is claimed is:

1. A point cloud position data processing device comprising:
   a data receiving circuit having a structure that receives reference point cloud position data, which is point cloud position data of a measured object, and that receives comparative laser scan data, which is obtained by scanning the measured object with laser light while a vehicle travels, the laser light emitted from a laser scanner that is fixed on the vehicle and that is to be calibrated;
   a comparative point cloud position data calculating circuit having a structure that calculates comparative point cloud position data in a coordinate system of the reference point cloud position data from the comparative laser scan data based on a trajectory the laser scanner has traveled; and
   an exterior orientation parameter calculating circuit having a structure that calculates exterior orientation parameters of the laser scanner based on a correspondence relationship between the reference point cloud position data and the comparative point cloud position data, wherein the reference point cloud position data is measured by a fixed laser scanner that is fixed on a ground and is described in an absolute coordinate system, the comparative point cloud position data is converted into data in the absolute coordinate system by setting an estimated margin of error of the exterior orientation parameters of the laser scanner, and a convergence condition for a margin of error in matching the reference point cloud position data and the comparative point cloud position data in the absolute coordinate system is searched, whereby the exterior orientation parameters of the laser scanner are calculated.

2. The point cloud position data processing device according to claim 1, wherein the comparative point cloud position data includes a scan point $P_1$ that is obtained at a position $O_1$ and a scan point $P_2$ that is obtained at a position $O_2$, and the point cloud position data processing device is configured to perform processing for describing the scan points $P_1$ and $P_2$ in the absolute coordinate system based on the trajectory of the laser scanner.

3. A point cloud position data processing method comprising:

receiving reference point cloud position data, which is point cloud position data of a measured object, and receiving comparative laser scan data, which is obtained by scanning the measured object with laser light while a vehicle travels, the laser light emitted from a laser scanner that is fixed on the vehicle and that is to be calibrated;

calculating comparative point cloud position data in a coordinate system of the reference point cloud position data from the comparative laser scan data based on a trajectory the laser scanner has traveled; and calculating exterior orientation parameters of the laser scanner based on a correspondence relationship between the reference point cloud position data and the comparative point cloud position data, including searching a convergence condition for a margin of error in matching the reference point cloud position data and the comparative point cloud position data in an absolute coordinate system, whereby the exterior orientation parameters of the laser scanner are calculated;

wherein the reference point cloud position data is measured by a fixed laser scanner that is fixed on a ground and is described in the absolute coordinate system, and the comparative point cloud position data is converted into data in the absolute coordinate system by setting an estimated margin of error of the exterior orientation parameters of the laser scanner.

4. A non-transitory computer readable storage medium storing program instructions which when executed by a computer, cause the computer to: receive reference point cloud position data, which is point cloud position data of a measured object, and receive comparative laser scan data, which is obtained by scanning the measured object with laser light while a vehicle travels, the laser light emitted from a laser scanner that is fixed on the vehicle and that is to be calibrated;

calculate comparative point cloud position data in a coordinate system of the reference point cloud position data from the comparative laser scan data based on a trajectory the laser scanner has traveled; and calculate exterior orientation parameters of the laser scanner based on a correspondence relationship between the reference point cloud position data and the comparative point cloud position data, including searching a convergence condition for a margin of error in matching the reference point cloud position data and the comparative point cloud position data in an absolute coordinate system, whereby the exterior orientation parameters of the laser scanner are calculated;

wherein the reference point cloud position data is measured by a fixed laser scanner that is fixed on a ground and is described in the absolute coordinate system, the comparative point cloud position data is converted into data in the absolute coordinate system by setting an estimated margin of error of the exterior orientation parameters of the laser scanner.

* * * * *